(12) United States Patent
Landine

(10) Patent No.: US 6,517,155 B1
(45) Date of Patent: Feb. 11, 2003

(54) DISPOSABLE SHOPPING CART SEAT LINER

(76) Inventor: Marc Landine, 203 N. Harbor Blvd. E. 145, San Pedro, CA (US) 90731

( * ) Notice: Subject to any disclaimer, the term of this patent is extended or adjusted under 35 U.S.C. 154(b) by 0 days.

(21) Appl. No.: 09/933,395

(22) Filed: Aug. 20, 2001

(51) Int. Cl.[7] ................................................. A47D 1/10
(52) U.S. Cl. ............................. 297/256.17; 280/33.993
(58) Field of Search ................. 297/256.17; 280/33.993

(56) References Cited

U.S. PATENT DOCUMENTS

| | | | | |
|---|---|---|---|---|
| 4,108,489 A | * | 8/1978 | Salzman | 297/256.17 |
| 4,621,004 A | * | 11/1986 | Madsen | 428/80 |
| 4,840,841 A | * | 6/1989 | Madsen | 428/286 |
| 5,330,250 A | * | 7/1994 | Reyes | 297/256.17 |
| 5,855,412 A | * | 1/1999 | Smith et al. | 297/256.17 |
| 6,036,264 A | * | 3/2000 | Lucree | 297/256.17 |
| 6,129,417 A | * | 10/2000 | Cohenb-Gyffe | 297/256.17 |
| 6,237,998 B1 | * | 5/2001 | Aprile | 297/256.17 |

* cited by examiner

*Primary Examiner*—Laurie K. Cranmer
(74) *Attorney, Agent, or Firm*—Goldstein & Lavas, P.C.

(57) ABSTRACT

A shopping cart seat liner, for use in protecting a shopping cart and its contents from contamination from a child seated therein, comprising a bottom panel, a front panel, a rear panel, and a pair of side panels. The bottom panel, front panel, rear panel, and side panels are attached to create a vessel which is open at a top lip for allowing the child to be seated: therein, and which is capable of folding flat prior to use. Leg cutouts are pre-scored on the front panel to create leg openings which allow the child's legs to extend outward from the seat liner therethrough.

2 Claims, 2 Drawing Sheets

DISPOSABLE SHOPPING CART SEAT LINER

BACKGROUND OF THE INVENTION

The invention relates to a disposable shopping cart seat liner. More particularly, the invention relates to a liner which is placed in a shopping seat before placing a child in the seat, to protect the food from fecal matter from the child.

For decades, shopping carts have had a seat near the handle. The seat provides considerable convenience for parents as they shop—allowing them to keep their child immediately in front of them while wheeling the cart down the store aisles.

In recent years, numerous diseases have come to light which are directly associated with, and are spread through fecal matter. Health organizations have focused considerable effort from avoiding contamination of food with fecal matter. Various steps along the food distribution chain have been scrutinized by health officials in an attempt to locate potential vulnerabilities and immediately put safeguards in place to help avoid contamination.

One step along the food distribution chain that has been largely ignored, is the possibility of food contamination in the shopping cart itself. In fact, the presence of a young child in close proximity with the food within the cart creates a significant possibility of contamination. Further since many children may be seated in the same cart in a short period of time, and shopping carts are not often cleaned, contaminants can easily accumulate.

In the past, some have proposed shopping cart seat lining devices. Most of these are for the purpose of increasing the comfort or safety of the child. In particular, U.S. Pat. No. 5,330,250 to Reyes, U.S. Pat. No. 5,897,165 to Kucharczyk et al., and U.S. Pat. No. 4,204,695 to Salzman disclose large, cumbersome, child seats which have restraints and or cushions, but do not effectively shield the cart from contamination. Further, since these devices are intended for multiple uses, and perhaps even for use by many different children, the possibility of food contamination is increased.

U.S. Pat. No. 6,129,417 to Cohen-Fyffe discloses a shopping cart seat cover which is made of a soft material, and is designed to conform to and fold over the front, rear, and sides of the seat through flaps which extend from a common bottom. Because of this configuration, which is essentially open along the edges between the flaps, it cannot prevent food contamination. Further because it is designed for multiple uses, it can further increase the risk of contamination.

U.S. Pat. No. 5,791,732 to Lucree discloses an antibacterial baby seat. Lucree describes the problem of the presence of bacteria in a shopping cart from a prior child who might contaminate the cart, but then seeks to protect only the child—not the food in the cart.

While these units may be suitable for the particular purpose employed, or for general use, they would not be as suitable for the purposes of the present invention as disclosed hereafter.

SUMMARY OF THE INVENTION

It is an object of the invention to provide a shopping cart seat liner which allows a child to be comfortably seated within the shopping cart seat, while protecting the cart and food contained therein from the possibility of fecal matter contamination. Accordingly, the seat surrounds the child on four sides to effectively shield the cart from bacteria or contaminants present on the child.

It is another object of the invention to provide a shopping cart seat liner which is disposable so that it cannot itself become a carrier of bacteria. Accordingly, the seat liner is as inexpensive to manufacture as a shopping bag.

It is a further object of the invention to provide a shopping cart seat liner which is easy and convenient to use. Accordingly, the shopping cart seat liner remains compactly folded prior to use. At the time of use, the shopping cart seat liner is unfolded in a similar manner that a shopping bag is unfolded, and simply placed within the shopping cart seat. As child is placed within the seat liner, the child's legs extend through the pre-scored leg cutouts.

The invention is a shopping cart seat liner, for use in protecting a shopping cart and its contents from contamination from a child seated therein, comprising a bottom panel, a front panel, a rear panel, and a pair of side panels. The bottom panel, front panel, rear panel, and side panels are attached to create a vessel which is open at a top lip for allowing the child to be seated therein, and which is capable of folding flat prior to use. Leg cutouts are prescored on the front panel to create leg openings which allow the child's legs to extend outward from the seat liner therethrough.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
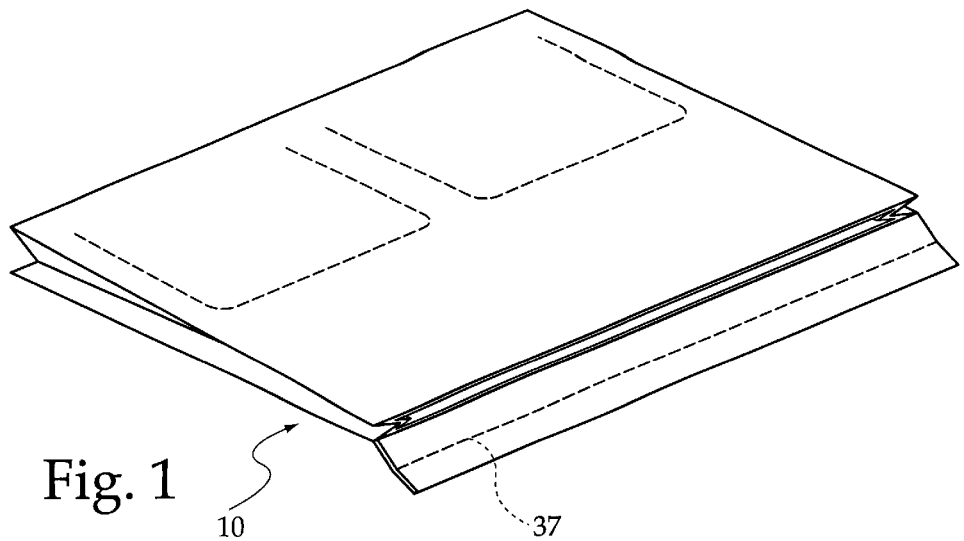
FIG. 1 diagrammatic perspective view of the seat liner of the present invention, folded in its storage position, prior to use.

FIG. 1 illustrates a shopping cart seat liner 10 according to the present invention. The shopping cart liner 10 is made of a thin, foldable, moisture proof material such as poly-coated wrapping paper. It is shown folded flat, in a storage position, in which it remains until use.

Figure 2:
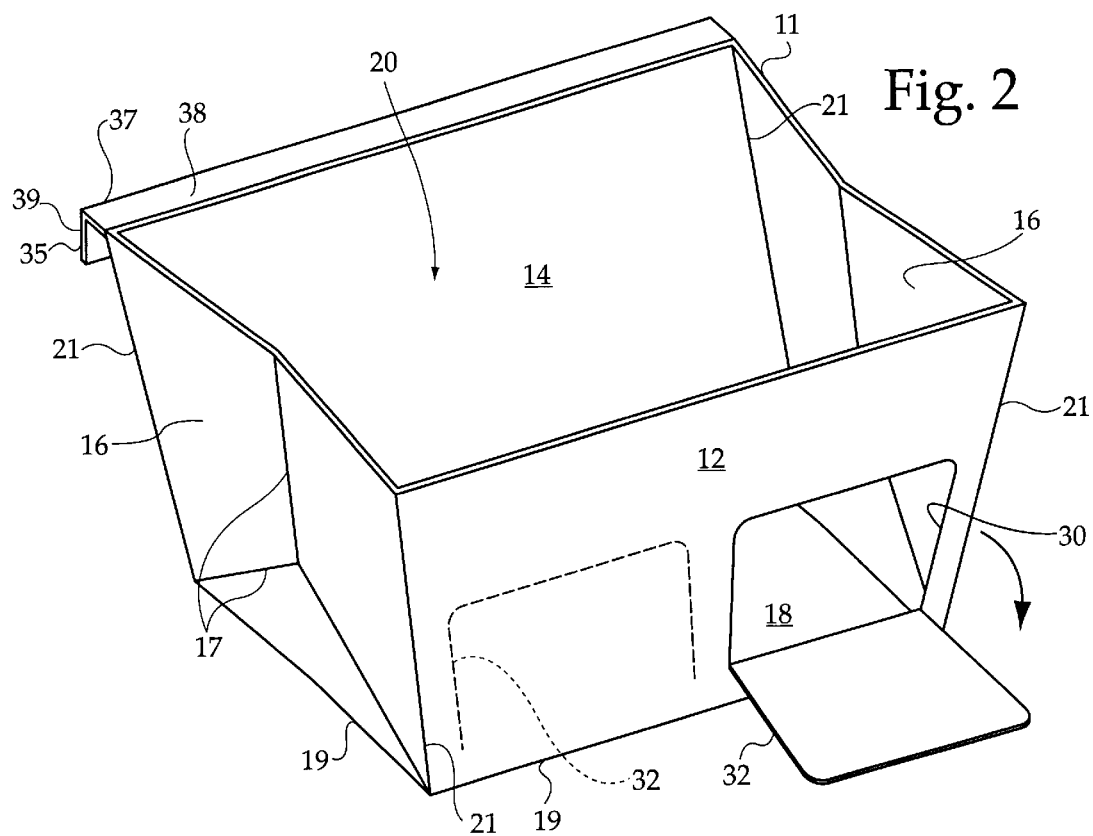
FIG. 2 is a diagrammatic perspective view of the seat liner of the present invention, opened for use, wherein one of the pre-scored leg cutouts is being opened to accommodate a child's leg.

FIG. 2 illustrates the shopping cart seat liner 10, unfolded prior to use, having a top edge 11, a front panel 12, a rear panel 14, two side panels 16, and a bottom 18. The bottom 18 is substantially rectangular and has four bottom edges 19 that are each joined to one of the front panel 12, rear panel 14, and two side panels 16. The front panel 12, rear panel 14, and side panels 16, are all substantially rectangular, each having two vertical edges 21, such that each vertical edge 21 of the front panel 12 and rear panel 14 is joined with one of the side panels 16 between the bottom panel 18 and the top lip 11. Accordingly, the front panel 12, rear panel 14, and two side panels 16 essentially create a vessel, open at the top lip 11 which defines an interior volume 20. The side panels 16 have pleats 17, which allow the side panels 16 to collapse inward so that the entire seat liner 10 can fold flat like a shopping bag.

The seat creates a substantially closed vessel for protecting the shopping cart from contamination, except for at the top lip 11, and at two leg openings 30, which are selectively present at the front panel 12. In particular, the front panel 12 is pre-scored with a pair of three sided leg cutouts 32, which may be opened as shown in FIG. 2 to create the leg openings 30. The leg cutouts 32 are preferably not scored immediately adjacent to the bottom panel 18, so that the leg cutouts 32 can remain attached to the front panel and fold laterally outward as shown, so that they extend outward beneath the leg opening 30 created thereby, and under the leg of the seated child, and protect the cart from contaminants which may be present on the child's leg.

Further, a flap 35 extends from rear panel 14 at the top lip 11. The flap 35 has a longitudinal fold 37 which creates a horizontal flap portion 38 and a downturned flap portion 39. The flap 35 may be used to hold the liner 10 in place while it is unfolded.

Figure 3:
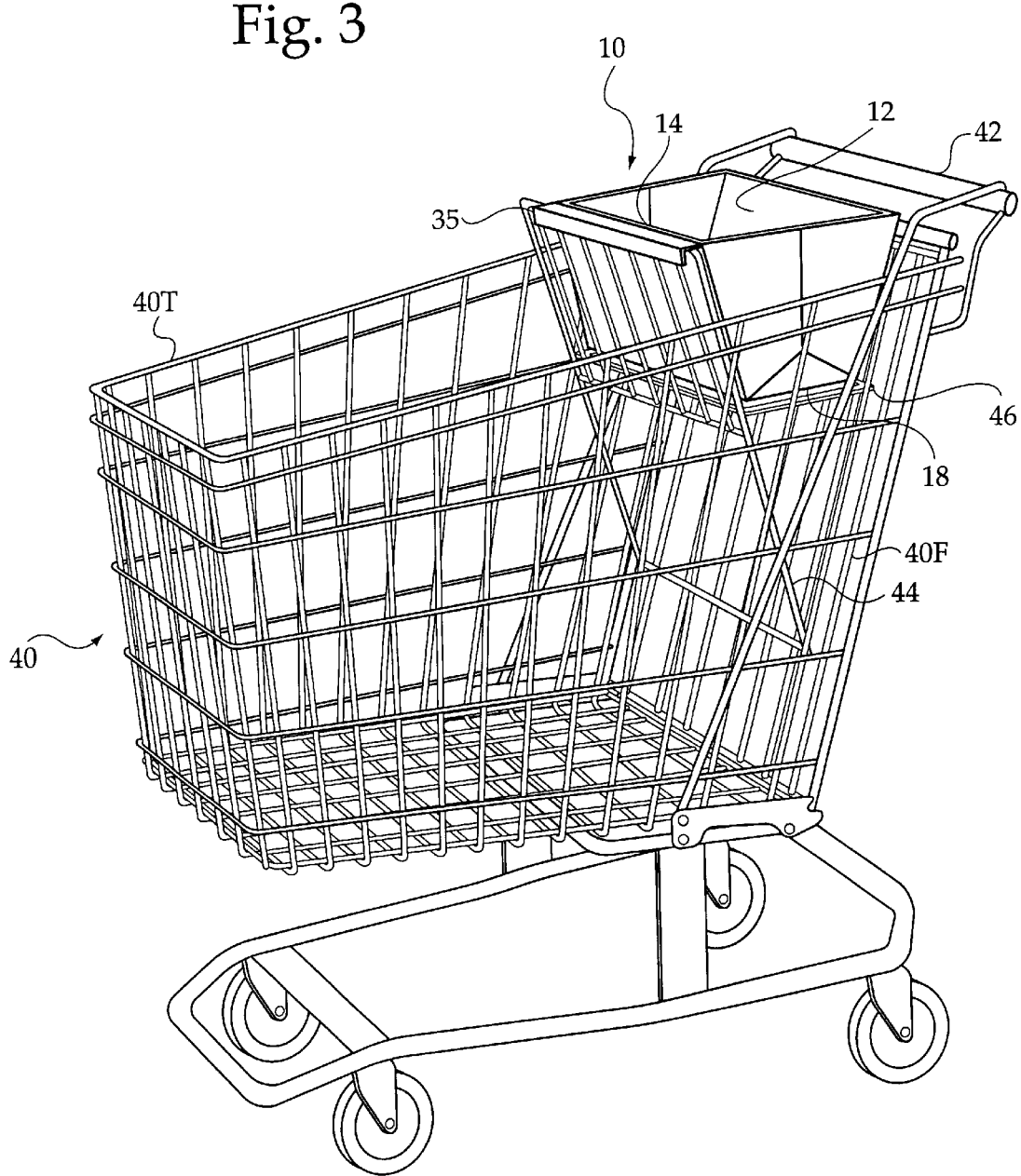
FIG. 3 is a diagrammatic perspective view, illustrating the seat liner installed into a shopping cart seat, and ready for use.

FIG. 3 illustrates the seat liner 10 in use in a shopping cart 40, having a shopping cart front wall 40F, a shopping cart top 40T, and a shopping cart handle 42 at the shopping cart top 40T, adjacent to the shopping cart front wall 40F. A shopping cart foldable wall 44 is hingeably mounted to the shopping cart front wall 40F, such that a shopping cart seat 46 is mounted at mid-height, between the shopping cart front wall 40F and shopping cart foldable wall 44. When the shopping cart foldable wall 44 is pivoted away from the shopping cart front wall 40F, the shopping cart seat 46 extends horizontally. In this position, the seat liner 10 is installed in place. In particular, the bottom 18 rests against the shopping cart seat 46, the rear panel 14 rests against the shopping cart foldable wall 44, and the front panel 12 rests against the shopping cart front wall 40F. The flap 35 extends over the shopping cart foldable wall 44. If the seat liner 10 is placed in the cart before it is unfolded, the flap 35 may be first placed over the shopping cart foldable wall 44 to in effect "anchor" the liner 10 so that it may be easily unfolded toward the shopping cart front wall 40F.

In conclusion, herein is presented a shopping cart seat liner which creates an enclosure allow a child to be seated therein and which effectively shields the shopping cart and food contained therein from possible contaminants present on the child. The invention is illustrated by example in the foregoing description and in the accompanying drawings. Numerous variations are possible, while adhering to the inventive concept. Such variations are contemplated as being a part of the present invention.

What is claimed is:

1. A shopping cart liner, for use in a shopping cart having a seat for allowing a child to be positioned in the seat while protecting the seat and cart from contaminants which may be present on the child, comprising:

a bottom panel, for resting against the seat, substantially rectangular in shape, having four bottom edges;

a front panel, substantially rectangular in shape, joined to the bottom panel, having two vertical edges, the front panel having a pair of leg cutouts, the leg cutouts each comprising a three sided pre-scoring in the front panel wherein the leg cutouts are not scored adjacent to the bottom panel, such that the leg openings may be selectively created by a user whereby the leg cutouts fold downward and extend laterally outward beneath the leg opening created thereby;

a rear panel, substantially rectangular in shape, joined to the bottom panel, having two vertical edges;

a pair of side panels, each of the side panels attached to one of the bottom edges, and extending between the front panel and rear panel, wherein the bottom panel, front panel, rear panel, and side panels form a vessel having an open top lip, such that each side panel is fully attached to the front panel along one of the vertical edges of the front panel fully between the bottom panel and top lip, and each side panel is fully attached to the rear panel along of the vertical edges of the rear panel fully between the bottom panel and top lip; and wherein the bottom panel, front panel, rear panel, and side panels are made from a thin, foldable material such that the shopping cart liner is capable of folding substantially flat.

2. The shopping cart liner as recited in claim 1, further comprising a flap, extending from the rear panel at the top lip, the flap having a longitudinal fold, creating a horizontal flap portion and a downturned flap portion, for anchoring the seat liner within the shopping cart so that the liner may be unfolded.

* * * * *